United States Patent
Yamada

(10) Patent No.: US 9,768,721 B2
(45) Date of Patent: Sep. 19, 2017

(54) MOBILE BODY AND MOBILE BODY SYSTEM

(71) Applicant: Murata Machinery, Ltd., Kyoto-shi, Kyoto (JP)

(72) Inventor: Yasutake Yamada, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/225,000

(22) Filed: Aug. 1, 2016

(65) Prior Publication Data

US 2017/0054399 A1 Feb. 23, 2017

(30) Foreign Application Priority Data

Aug. 21, 2015 (JP) ................................. 2015-163948

(51) Int. Cl.
| | |
|---|---|
| H02K 41/02 | (2006.01) |
| H02P 25/06 | (2016.01) |
| H02K 11/215 | (2016.01) |
| G01D 5/14 | (2006.01) |

(52) U.S. Cl.
CPC ............ *H02P 25/06* (2013.01); *G01D 5/145* (2013.01); *H02K 11/215* (2016.01); *H02K 41/02* (2013.01)

(58) Field of Classification Search
CPC ... H02P 21/00; H02P 6/00; H02P 6/14; G05B 11/01; H02K 41/02; H02K 41/025; H02K 21/00; H02K 21/14; H02K 29/06; H02K 29/08; H02K 41/00
USPC ........ 318/400.01, 400.02, 400.14, 700, 701, 318/727, 779, 799, 800, 801, 430, 432, 318/437, 119, 135, 400.37, 400.38, 721; 388/800, 901, 931, 909; 324/207.24, 324/207.13
See application file for complete search history.

(56) References Cited

U.S. PATENT DOCUMENTS

| | | | |
|---|---|---|---|
| 8,072,173 B2 * | 12/2011 | Hamahata | .............. B25J 9/1674 318/400.2 |
| 2016/0072367 A1 | 3/2016 | Yamada et al. | |

FOREIGN PATENT DOCUMENTS

JP 62-114402 A 5/1987

* cited by examiner

*Primary Examiner* — Antony M Paul
(74) *Attorney, Agent, or Firm* — DLA Piper LLP (US)

(57) ABSTRACT

A mobile body of one embodiment moves along a magnetic pole path including a magnetic pole missing section, and includes a first linear motor, a drive information acquiring unit, a drive command unit, a monitor, and a determination unit. The drive information acquiring unit acquires, in real time, drive information of the first linear motor being driven toward a target position. The drive command unit repeatedly provides, to the first linear motor side, command information for moving the mobile body toward the target position based on the drive information acquired each time by the drive information acquiring unit. The monitor monitors the command information or the drive information. The determination unit determines whether or not the first linear motor is located in the magnetic pole missing section based on the command information or the drive information monitored by the monitor.

18 Claims, 5 Drawing Sheets

MOBILE BODY AND MOBILE BODY SYSTEM

CROSS-REFERENCE TO RELATED APPLICATIONS

This application claims priority under 35 U.S.C. 119 to Japanese Patent Application No. 2015-163948, filed on Aug. 21, 2015, which application is hereby incorporated by reference in its entirety.

BACKGROUND OF THE INVENTION

1. Field of the Invention

The present invention relates to a mobile body that moves along a movement path in which a plurality of pairs of magnetic poles, each including a north pole and a south pole, are arranged, by using a linear motor.

2. Description of the Related Art

There has been known a mobile body system including a mobile body having a linear motor and a magnetic pole path in which a plurality of pairs of magnetic poles, each including a north pole and a south pole, are arranged. In this kind of mobile body system, the linear motor is driven by magnetic interaction with a magnetic flux of the magnetic pole path, and the mobile body thereby moves along the magnetic pole path.

Meanwhile, in this kind of mobile body system, a magnetic pole path may have a magnetic pole missing section in which the magnetic pole is missing.

In this respect, there is a mobile body system in which a mobile body includes two linear motors, two magnet absence detecting sensors (e.g., photo sensors), and two position detecting sensors (e.g., Hall elements). The two magnet absence detecting sensors and the two position detecting sensors are provided in the mobile body, respectively corresponding to the two linear motors. In this mobile body, when one magnet absence detecting sensor detects one linear motor being located in the magnetic pole missing section, switching is made to the other linear motor, to enable continuous driving. Further, in this mobile body, when it is detected that one position detecting sensor is located in the magnetic pole missing section, switching is made to the other position detecting sensor, to enable continuous position detection for the mobile body.

BRIEF SUMMARY OF THE INVENTION

Meanwhile, in this mobile body, the magnet absence detecting sensor and the linear motor are offset in a path direction of the magnetic pole path, thus making it difficult for the magnet absence detecting sensor to detect every state of the linear motor being located in the magnetic pole missing section. In particular, when the mobile body is started while the linear motor is located in the magnetic pole missing section, it is not possible to detect the linear motor being located in the magnetic pole missing section, which results in a decrease in thrust of the linear motor or generation of thrust in a reverse direction.

BRIEF SUMMARY OF THE INVENTION

Therefore, it is an object of the present invention to provide a mobile body capable of determining that a linear motor is located in a magnetic pole missing section on a magnetic pole path.

According to a first aspect, a mobile body of the present invention is configured as follows. The mobile body moves along a magnetic pole path having a magnetic pole section in which a plurality of pairs of magnetic poles, each including a north pole and a south pole, are arranged, and a magnetic pole missing section in which the magnetic pole is missing. The mobile body includes a plurality of linear motors, a drive information acquiring unit, a drive command unit, a monitor, and a determination unit. The plurality of linear motors include a first linear motor that is driven by magnetic interaction with a magnetic flux of the magnetic pole path. The drive information acquiring unit acquires, in real time, drive information of the first linear motor being driven toward a target position. The drive command unit repeatedly provides, to the first linear motor side, command information for moving the mobile body toward the target position based on the drive information acquired each time by the drive information acquiring unit. The monitor monitors the command information or the drive information. The determination unit determines whether or not the first linear motor is located in the magnetic pole missing section based on the command information or the drive information monitored by the monitor.

According to a second aspect, a mobile body system of the present invention is configured as follows. The mobile body system includes a magnetic pole path, a mobile body, and a determination unit. The magnetic pole path has a magnetic pole section in which a plurality of pairs of magnetic poles, each including a north pole and a south pole, are arranged, and a magnetic pole missing section in which the magnetic pole is missing. The mobile body moves along the magnetic pole path, and includes a plurality of linear motors, a drive information acquiring unit, a drive command unit, and a monitor. The plurality of linear motors include a first linear motor driven by magnetic interaction with a magnetic flux of the magnetic pole path. The drive information acquiring unit acquires, in real time, drive information of the first linear motor being driven toward a target position. The drive command unit repeatedly provides, to the first linear motor side, command information for moving the mobile body toward the target position based on the drive information acquired each time by the drive information acquiring unit. The monitor monitors the command information or the drive information. Then, the determination unit determines whether or not the first linear motor is located in the magnetic pole missing section based on the command information or the drive information monitored by the monitor.

When the linear motor is located in the magnetic pole missing section on the magnetic pole path, an actual velocity of the mobile body is lower than a command velocity or is a negative velocity. Thereby, the command velocity is controlled to become higher, leading to an increase in difference between the actual velocity and the command velocity. As a result, control to increase a command current and to increase an actual current is performed.

Accordingly, based on a signal that increases, it is possible to determine whether or not the linear motor is located in the magnetic pole missing section on the magnetic pole path.

Further, it is preferable that the mobile body and the mobile body system according to the present invention are configured as follows. The drive information acquiring unit acquires an actual velocity of the first linear motor in real time, the drive command unit repeatedly provides, to the first linear motor side, a command current for moving the mobile body toward the target position based on the actual velocity acquired by the drive information acquiring unit, and the monitor monitors the command current.

Further, it is preferable that the mobile body and the mobile body system according to the present invention are configured as follows. When the command current monitored by the monitor exceeds a first threshold, the determination unit determines that the first linear motor is located in the magnetic pole missing section.

Further, it is preferable that the mobile body and the mobile body system according to the present invention are configured as follows. The mobile body and the mobile body system further include a receptor that accepts a start signal for instructing to shift from a stopped state where the mobile body is stopped to a started state. When the receptor accepts the start signal, the determination unit determines whether or not the first linear motor is located in the magnetic pole missing section.

Further, it is preferable that the mobile body and the mobile body system according to the present invention are configured as follows. The mobile body and the mobile body system are movable in a low velocity mode having a velocity lower than a velocity at the time of normal movement. While the mobile body moves a certain distance in the low velocity mode, the determination unit determines whether the first linear motor is located in the magnetic pole missing section.

Further, it is preferable that the mobile body and the mobile body system according to the present invention are configured as follows. The mobile body and the mobile body system further include a magnetic pole-less detecting sensor for detecting the magnetic pole missing section.

Accordingly, the magnetic pole-less sensor performs detection while the determination unit performs determination, thus enabling more accurate detection of the magnetic pole missing section.

Further, it is preferable that the mobile body and the mobile body system according to the present invention are configured as follows. When the magnetic pole-less detecting sensor does not detect the magnetic pole missing section, the determination unit determines whether or not the first linear motor is located in the magnetic pole missing section.

Further, it is preferable that the mobile body and the mobile body system according to the present invention are configured as follows. The magnetic pole path includes a tilt path with a height difference in a vertical direction. The magnetic pole missing section is provided on a path other than the tilt path in the magnetic pole path. The drive command unit provides, to the first linear motor side, the command information such that the first linear motor holds its own position by feedback of an actual current value acquired by the drive information acquiring unit when the mobile body is in a stopped state. The determination unit determines that the first linear motor is not located in the magnetic pole missing section based on the command current value monitored by the monitor.

Accordingly, in an environment of a magnetic pole rail where the magnetic pole absence section is not provided on a slope, the presence or absence of the magnetic pole missing section can be determined by determination as to whether or not the first linear motor is located in the magnetic pole missing section from a current value accompanying a motor lock function that is generated during the stoppage.

Further, it is preferable that the mobile body and the mobile body system according to the present invention are configured as follows. The mobile body and the mobile body system further includes: a first detector that is disposed on one side with respect to the first linear motor in a path direction of the magnetic pole path, and detects a first phase angle in accordance with the magnetic flux of the magnetic pole path; a second detector that is disposed on the other side with respect to the first linear motor in the path direction of the magnetic pole path, and detects a second phase angle in accordance with the magnetic flux of the magnetic pole path; a storage unit that previously stores, as a reference phase difference, a phase difference between the first phase angle detected by the first detector and the second phase angle detected by the second detector, the phase difference at the time when the first linear motor is located in the magnetic pole section; and an estimator that estimates whether or not the first linear motor is located in the magnetic pole missing section based on an amount of deviation of the phase difference from the reference phase difference, the phase difference between the first phase angle detected by the first detector and the second phase angle detected by the second detector.

The above and other elements, features, steps, characteristics and advantages of the present invention will become more apparent from the following detailed description of the preferred embodiments with reference to the attached drawings.

DETAILED DESCRIPTION OF PREFERRED EMBODIMENT

Figure 1:
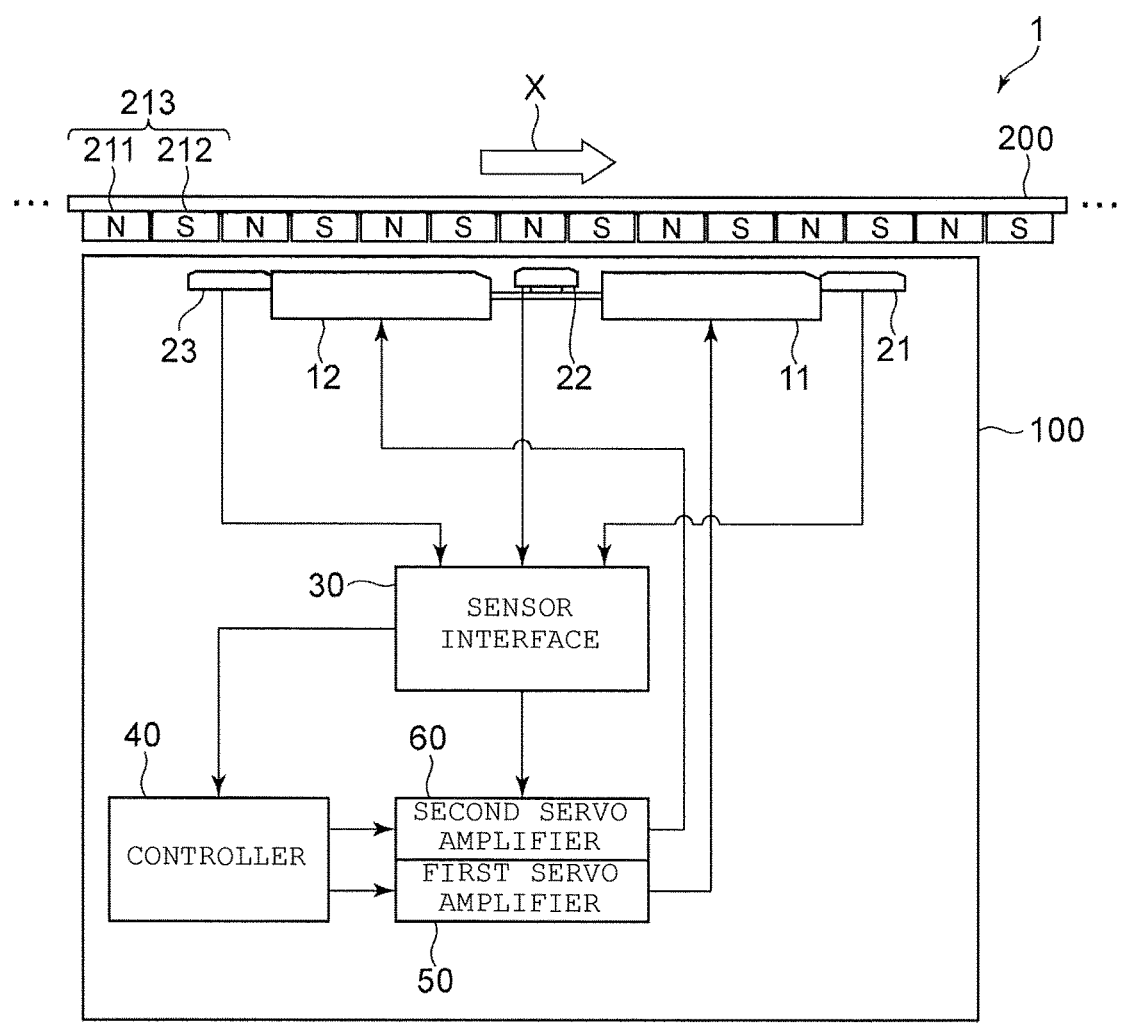
FIG. 1 is a diagram illustrating a mobile body system according to one embodiment and a mobile body according to one embodiment of the present invention.

Hereinafter, a preferred embodiment of the present invention will be described in detail with reference to the drawings. The same reference numerals are denoted on the same or corresponding portions throughout the drawings.

FIG. 1 is a diagram illustrating a mobile body system according to one embodiment and a mobile body according to one embodiment of the present invention. A mobile body system 1 illustrated in FIG. 1 includes a mobile body 100 and a magnetic pole path 200.

On the magnetic pole path 200, north pole magnets 211 and south pole magnets 212 are alternately disposed at a predetermined pitch (e.g., 33 mm) in a line. In other words, a plurality of pairs of magnetic poles 213, each including a north pole and a south pole, are arranged on the magnetic pole path 200. The mobile body 100 moves along the magnetic pole path 200 by using a linear motor.

One example of the mobile body system 1 is an overhead travelling vehicle system in which a transport vehicle (mobile body) 100 travels along a rail (magnetic pole path) 200 installed on the ceiling. In this kind of mobile body system 1, the rail 200 may have a length of several km, and the number of transport vehicles 100 may be 300 to 400. The mobile body may be a transport vehicle travelling on the ground, or may not be a transport vehicle. For example, the mobile body may be any vehicle other than the transport vehicle, a robot arm, or the like.

Figure 3:
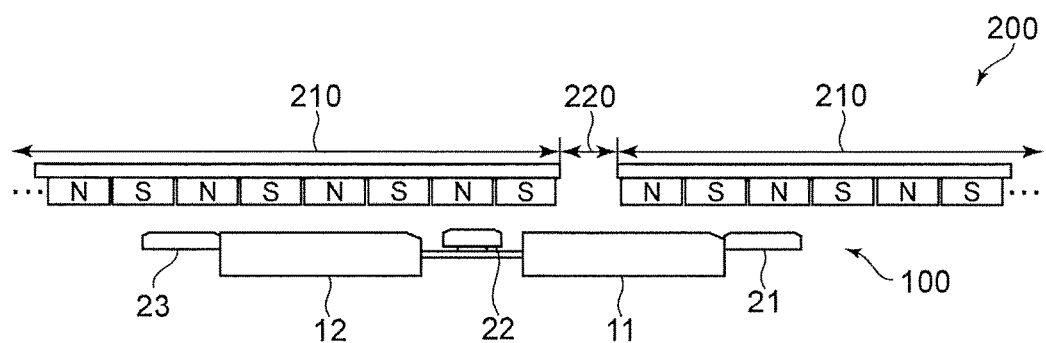
FIG. 3 is a diagram illustrating a main part of the mobile body when a first linear motor is located in a magnetic pole missing section.

In this kind of mobile body system, the length of the magnetic pole path variously changes depending on layout of a factory, for example, and it is not necessarily an integral multiple of a predetermined pitch (e.g., 33 mm). Further, at a junction of a linear path and a curve path on the magnetic pole path, it is difficult to arrange the magnets at the above predetermined pitch (e.g., 33 mm). For these reasons, as illustrated in FIG. 3, the magnetic pole path 200 has a magnetic pole section 210 in which a plurality of pair of magnetic poles 213 are arranged at a predetermined pitch (e.g., 66 mm), and a magnetic pole missing section 220 in which the magnetic pole is missing.

Figure 2:
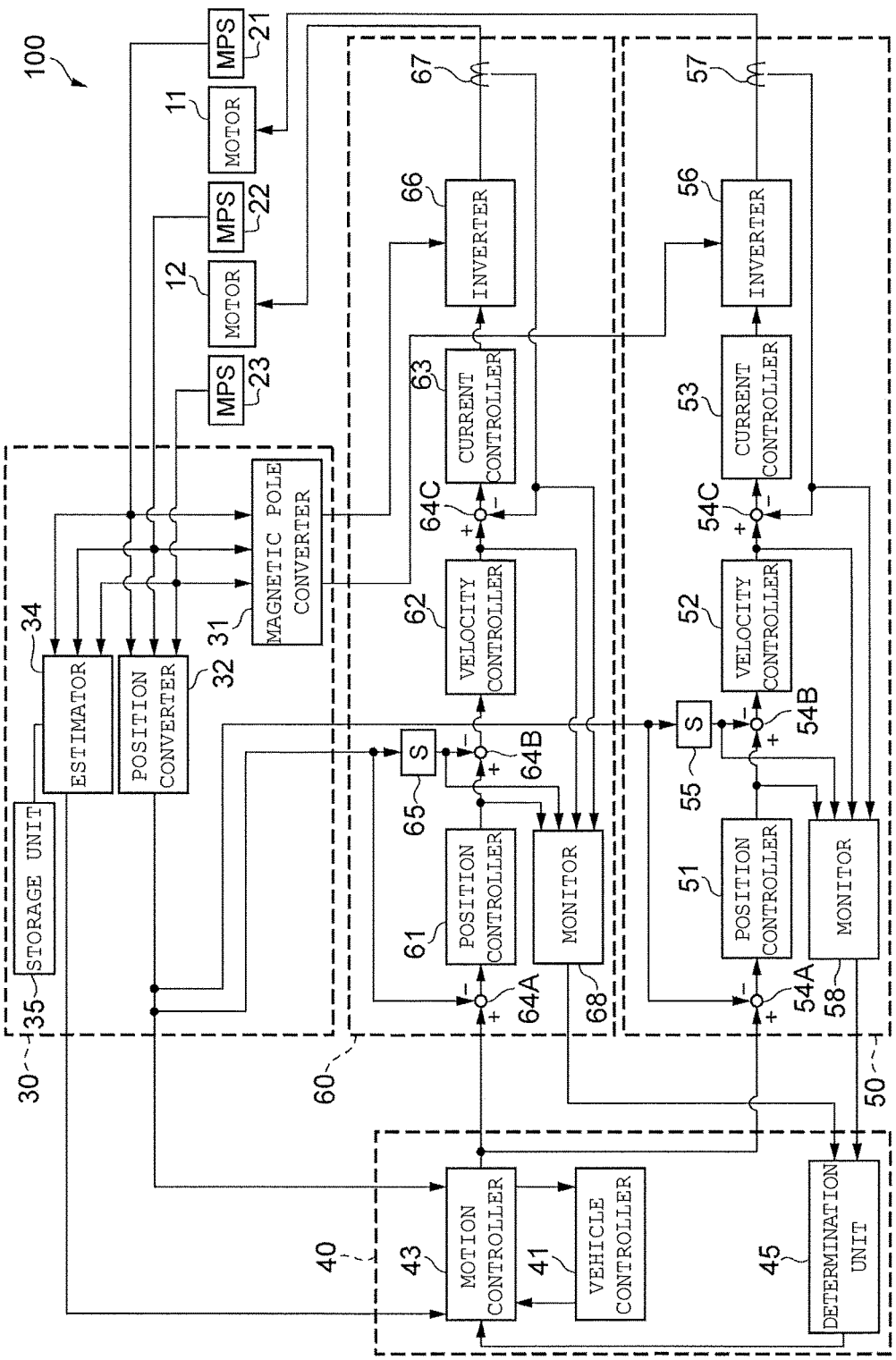
FIG. 2 is a diagram illustrating the mobile body in the mobile body system illustrated in FIG. 1.

FIG. 2 is a diagram illustrating the mobile body in the mobile body system illustrated in FIG. 1. The mobile body 100 illustrated in FIGS. 1 and 2 includes first and second linear motors 11, 12, first, second, and third magnetic pole sensors 21, 22, 23, a sensor interface 30, a controller 40, and first and second servo amplifiers 50, 60. In the present embodiment, the first magnetic pole sensor 21, the first linear motor 11, the second magnetic pole sensor 22, the second linear motor 12, and the third magnetic pole sensor 23 are disposed sequentially from the upstream side of a moving direction X of the mobile body 100. In the present embodiment, with respect to the first linear motor 11, the first and second magnetic pole sensors 21, 22 respectively correspond to the first and second detectors in the claims. With respect to the second linear motor 12, the third and second sensors 23, 22 respectively correspond to the first and second detectors in the claims. Note that the first and second detectors may be any sensors that sandwich each linear motor. For example, with respect to the first linear motor 11, the first and third magnetic pole sensors 21, 23 may be the first and second detectors. Similarly, with respect to the second linear motor 12, the first and third magnetic pole sensors 21, 23 may be the first and second detectors.

Each of the first and second linear motors 11, 12 is a three-phase linear motor, for example, and is driven by magnetic interaction with a magnetic flux of the magnetic pole path 200. A magnetic field of the first linear motor 11 is controlled by an AC drive current from the first servo amplifier 50, and a magnetic field of the second linear motor 12 is controlled by an AC drive current from the second servo amplifier 60. The first linear motor 11 and the second linear motor 12 are disposed in different positions in the moving direction X of the mobile body 100 (the path direction of the magnetic pole path 200).

The first magnetic pole sensor 21 is a magnetic pole sensor (MPS) for detecting the magnetic pole of the magnetic pole path 200, and includes a Hall element, for example. With such a configuration, the first magnetic pole sensor 21 detects a phase angle (a first phase angle) in accordance with the magnetic flux of the magnetic pole path 200, with a pair of magnetic poles 213 including the north pole and the south pole taken as one cycle. Since the phase angle detected by this magnetic pole sensor is used for an electrical angle of the first linear motor 11 as described later, this magnetic pole sensor is referred to as a first electrical angle detecting sensor.

Similarly, the third magnetic pole sensor 23 is a magnetic pole sensor (MPS) for detecting the magnetic pole of the magnetic pole path 200, and includes a Hall element, for example. With such a configuration, the third magnetic pole sensor 23 detects a phase angle (a first phase angle) in accordance with the magnetic flux of the magnetic pole path 200, with a pair of magnetic poles 213 including the north pole and the south pole taken as one cycle. Since the phase angle detected by this magnetic pole sensor is used for an electrical angle of the second linear motor 12 as described later, this magnetic pole sensor is referred to as a second electrical angle detecting sensor.

Further, the second magnetic pole sensor 22 is a magnetic pole sensor (MPS) for detecting the magnetic pole of the magnetic pole path 200, and includes a Hall element, for example. With such a configuration, the second magnetic pole sensor 22 detects a phase angle (a second phase angle) in accordance with the magnetic flux of the magnetic pole path 200, with a pair of magnetic poles 213 including the north pole and the south pole taken as one cycle. Since the phase angle detected by this magnetic pole sensor is used for detecting the position of the mobile body 100 as described later, this magnetic pole sensor is referred to as a position detecting sensor.

Each of the first, second, and third magnetic pole sensors 21, 22, 23 has a function of determining whether or not it is located in the magnetic pole missing section 220 based on the detected magnetic flux of the magnetic pole path 200. When it is not located in the magnetic pole missing section 220, each of the first, second, and third magnetic pole sensors 21, 22, 23 outputs a signal (validation) indicating that the output is in a valid state. When it is located in the magnetic pole missing section, each of the first, second, and third magnetic pole sensors 21, 22, 23 outputs a signal (validation) indicating that the output is in an invalid state.

The first magnetic pole sensor 21, the second magnetic pole sensor 22, and the third magnetic pole sensor 23 are disposed in different positions in the moving direction X of the mobile body 100 (the path direction of the magnetic pole path 200). Specifically, the first magnetic pole sensor 21 is disposed on one side with respect to the first linear motor 11 in the moving direction X of the mobile body 100 (the path direction of the magnetic pole path 200), and the second magnetic pole sensor 22 is disposed on the other side with respect to the first linear motor 11 in the moving direction X of the mobile body 100 (the path direction of the magnetic pole path 200). That is, the first magnetic pole sensor 21 and the second magnetic pole sensor 22 are disposed so as to sandwich the first linear motor 11 in the moving direction X of the mobile body 100 (the path direction of the magnetic pole path 200). Further, the second magnetic pole sensor 22 is disposed on one side with respect to the second linear motor 12 in the moving direction X of the mobile body 100 (the path direction of the magnetic pole path 200), and the third magnetic pole sensor 23 is disposed on the other side with respect to the second linear motor 12 in the moving direction X of the mobile body 100 (the path direction of the magnetic pole path 200). That is, the second magnetic pole sensor 22 and the third magnetic pole sensor 23 are disposed so as to sandwich the second linear motor 12 in the moving direction X of the mobile body 100 (the path direction of the magnetic pole path 200).

The sensor interface 30 includes a magnetic pole converter 31, a position converter 32, an estimator 34, and a storage unit 35.

The magnetic pole converter 31 derives an electrical angle (a magnetic pole) of a magnetic field of the first linear motor 11 for obtaining thrust by magnetic interaction, namely, an electrical angle of a drive current of the first linear motor 11, based on the phase angle outputted by the first magnetic pole sensor 21. Specifically, the magnetic pole converter 31 adds an offset angle in accordance with a distance between the first linear motor 11 and the first magnetic pole sensor 21 to the phase angle outputted by the first magnetic pole sensor 21, and takes the obtained angle as the electrical angle of the first linear motor 11. The magnetic pole converter 31 supplies the first servo amplifier 50 with the derived electrical angle (magnetic pole) of the first linear motor 11.

Similarly, the magnetic pole converter 31 derives an electrical angle (a magnetic pole) of a magnetic field of the second linear motor 12 for obtaining thrust by magnetic interaction, namely, an electrical angle of a drive current of the second linear motor 12, based on the phase angle outputted by the third magnetic pole sensor 23. Specifically, the magnetic pole converter 31 adds an offset angle in accordance with a distance between the second linear motor 12 and the third magnetic pole sensor 23 to the phase angle outputted by the third magnetic pole sensor 23, and takes the obtained angle as the electrical angle of the second linear motor 12. The magnetic pole converter 31 supplies the second servo amplifier 60 with the derived electrical angle (magnetic pole) of the second linear motor 12.

The position converter 32 derives a position of the mobile body 100 based on a phase angle outputted by the second magnetic pole sensor 22 and a predetermined pitch length (e.g., 66 mm) of the pair of magnetic poles 213. The position converter 32 supplies the derived position of the mobile body 100 to the controller 40 and the first and second servo amplifiers 50, 60. Further, the position converter 32 supplies the controller 40 with the signals (validations) received from the first, second, and third magnetic pole sensors 21, 22, 23 and indicating the valid/invalid state.

Further, the estimator 34 operates in association with the storage unit 35 to estimate whether or not the first and second linear motors 11, 12 are located in the magnetic pole missing section 220. When they are located in the magnetic pole missing section 220, the estimator 34 supplies the controller 40 with a signal (magnet-less status) indicating a magnet missing state where the first and second linear motors 11, 12 are located in the magnetic pole missing section 220. Details of the estimator 34 and the storage unit 35 will be described later.

The controller 40 includes a vehicle controller 41, a motion controller 43, and a determination unit 45. Note that the vehicle controller 41 functions as the receptor described in the claims.

The vehicle controller 41 acquires drive control information of the mobile body, such as a target position, a target velocity, and a target stop-distance, from the host controller (not illustrated), and previously stores the information. The vehicle controller 41 supplies these pieces of information to the motion controller 43.

Further, the vehicle controller 41 functions as the receptor and accepts a start signal for starting the mobile body 100 from the host controller (not illustrated), namely, a start signal for instructing to shift from a stopped state where the mobile body is stopped to a started state. Based on this start signal, the vehicle controller 41 controls starting of each unit in the mobile body 100.

The determination unit 45 determines whether or not the first and second linear motors 11, 12 are located in the magnetic pole missing section 220. When they are located in the magnetic pole missing section 220, the determination unit 45 supplies the controller 40 with a signal indicating a magnet missing state (magnet-less status) where the first and second linear motors 11, 12 are located in the magnetic pole missing section 220. Details of the determination unit 45 will be described later.

When a valid state signal (validation) of the first magnetic pole sensor 21 is received from the position converter 32 and a magnetic pole missing state (magnet-less status) signal of the first linear motor 11 is not received from the estimator 34 or the determination unit 45, the motion controller 43 supplies the first servo amplifier 50 with a position command (command position) for reaching a command position based on the present position information (position) from the position converter 32. On the other hand, when an invalid state signal (validation) of the first magnetic pole sensor 21 is received from the position converter 32 or a magnetic pole missing state (magnet-less status) signal of the first linear motor 11 is received from the estimator 34 or the determination unit 45, the motion controller 43 stops the supply of the position command (command position) to the first servo amplifier 50.

Similarly, when a valid state signal (validation) of the third magnetic pole sensor 23 is received from the position converter 32 and a magnetic pole missing state (magnet-less status) signal of the second linear motor 12 is not received from the estimator 34 or the determination unit 45, the motion controller 43 supplies the second servo amplifier 60 with a position command (command position) for reaching a command position based on the present position information (position) from the position converter 32. On the other hand, when an invalid state signal (validation) of the third magnetic pole sensor 23 is received from the position converter 32 or a magnetic pole missing state (magnet-less status) signal of the second linear motor 12 is received from the estimator 34 or the determination unit 45, the motion controller 43 stops the supply of the position command (command position) to the second servo amplifier 60.

The first servo amplifier 50 has a position controller 51, a velocity controller 52, a current controller 53, subtractors 54A, 54B, 54C, a differentiator 55, an inverter 56, a current sensor 57, and a monitor 58.

The position controller 51 receives input of data (position difference data) obtained by the subtractor 54A calculating a difference between the target position indicated by the position command from the motion controller 43 and the present position indicated by the position information from the position converter 32. The position controller 51 outputs velocity data in accordance with this position difference data.

The velocity controller 52 receives input of data (velocity difference data) obtained by the differentiator 55 differentiating the position information from the position converter 32 and by the subtractor 54B calculating a difference between this differentiation data and the velocity data from the position controller 51. The velocity controller 52 outputs current value data in accordance with this velocity difference data.

The current controller 53 receives input of data (current value difference data) obtained by the current sensor 57 detecting the present current value of the first linear motor 11 and by the subtractor 54C calculating a difference between the current value data from the velocity controller 52 and feedback data in accordance with the present current value (the actual current value) from the current sensor 57. The current controller 53 outputs a DC drive current in accordance with this current value difference data.

The inverter 56 converts the DC drive current from the current controller 53 to an AC drive current based on the electrical angle of the first linear motor from the magnetic pole converter 31, to generate a drive current for driving the first linear motor. One example of the inverter 56 is a three-phase inverter using an intelligent power module (IPM). Details of the monitor 58 will be described later.

Similarly, the second servo amplifier 60 has a position controller 61, a velocity controller 62, a current controller 63, subtractors 64A, 64B, 64C, a differentiator 65, an inverter 66, a current sensor 67, and a monitor 68.

The position controller 61 receives input of data (position difference data) obtained by the subtractor 64A calculating a difference between the target position indicated by the position command from the motion controller 43 and the present position indicated by the position information from the position converter 32. The position controller 61 outputs velocity data in accordance with this position difference data.

The velocity controller 62 receives input of data (velocity difference data) obtained by the differentiator 65 differentiating position information from the position converter 32 and by the subtractor 64B calculating a difference between this differentiation data and the velocity data from the position controller 61. The velocity controller 62 outputs current value data in accordance with this velocity difference data.

The current controller 63 receives input of data (current value difference data) obtained by the current sensor 67 detecting the present current value of the second linear motor 12 and by the subtractor 64C calculating a difference between the current value data from the velocity controller 62 and feedback data in accordance with the present current value (the actual current value) from the current sensor 67. The current controller 63 outputs a DC drive current in accordance with this current value difference data.

The inverter 66 converts the DC drive current from the current controller 63 to an AC drive current based on the electrical angle of the second linear motor from the magnetic pole converter 31, to generate a drive current for driving the second linear motor. One example of the inverter 66 is a three-phase inverter using an intelligent power module (IPM). Details of the monitor 68 will be described later.

Next, detailed descriptions will be given of the estimation performed by the estimator 34 and the storage unit 35 as to whether or not the first and second linear motors 11, 12 are located in the magnetic pole missing section 220, and the determination performed by the determination unit 45, the monitor 58, the drive information acquiring unit, and the drive command unit as to whether or not the first and second linear motors 11, 12 are located in the magnetic pole missing section 220. Note that the position converter 32 in the sensor interface 30, the differentiator 55 and the current sensor 57 in the first servo amplifier 50, and the differentiator 65 and the current sensor 67 in the second servo amplifier 60 correspond to the drive information acquiring unit. The position controller 51 and the velocity controller 52 in the first servo amplifier 50 and the position controller 61 and the velocity controller 62 in the second servo amplifier 60 correspond to the drive command unit described in the claims.

When the original thrust cannot be obtained by the linear motor due to the existence of the magnetic pole missing section on the linear motor, thrust F of the linear motor can be represented by approximately F×cos θ, where θ is a phase angle corresponding to a distance of the magnetic pole missing section (i.e., an error of an electrical angle due to the distance of the magnetic pole missing section). It is thereby found that the thrust F decreases when 0<θ<90° and 270°<θ<360°, the thrust F becomes zero when θ=90°, 270°, and reverse thrust F is generated when 90°<θ<270°. Note that this matters little when the length of the magnetic pole missing section is the same as the pitch length of the pair of magnetic poles.

Then, the estimator 34 and the storage unit 35 determine whether or not the first and second linear motors 11, 12 are located in the magnetic pole missing section 220, and the determination unit 45, the monitor 58, the drive information acquiring unit, and the drive command unit determine whether or not the first and second linear motors 11, 12 are located in the magnetic pole missing section 220. For example, first, in the estimation by the estimator 34 and the storage unit 35, it is estimated whether or not the first and second linear motors 11, 12 are located in the magnetic pole missing section 220 in which the reverse thrust is generated, one specific example of which is the magnetic pole missing section 220 having a distance longer than one-quarter pitch with respect to one pitch of the distance of the pair of magnetic poles 213. Then, for example, in the determination by the determination unit 45, the monitor 58, the drive information acquiring unit, and the drive command unit, it is determined whether or not the first and second linear motors 11, 12 are located in the magnetic pole missing section 220 in which the thrust decreases, one specific example of which is the magnetic pole missing section 220 having a distance equal to or shorter than one-quarter pitch.

The example has been shown where the estimator 34 and the storage unit 35 estimate whether or not the first and second linear motors 11, 12 are located in the magnetic pole missing section 220 having a distance longer than one-quarter pitch. However, the distance of the magnetic pole missing section 220 estimated by the estimator 34 and the storage unit 35 is not limited thereto. Similarly, the example has been shown where the determination unit 45, the monitor 58, the drive information acquiring unit, and the drive command unit determine whether or not the first and second linear motors 11, 12 are located in the magnetic pole missing section 220 having a distance equal to or shorter than one-quarter pitch. However, the distance of the magnetic pole missing section 220 determined by the determination unit 45, the monitor 58, the drive information acquiring unit, and the drive command unit is not limited thereto. Further, the example has been shown where the estimator 34 and the storage unit 35 estimate whether or not the first and second linear motors 11, 12 are located in the magnetic pole missing section 220 in which the reverse thrust is generated. However, the magnetic pole missing section 220 estimated by the estimator 34 and the storage unit 35 is not limited thereto. Similarly, the example has been shown where the determination unit 45, the monitor 58, the drive information acquiring unit, and the drive command unit determine whether or not the first and second linear motors 11, 12 are located in the magnetic pole missing section 220 in which the reverse thrust decreases. However, the magnetic pole missing section 220 determined by the determination unit 45, the monitor 58, the drive information acquiring unit, and the drive command unit is not limited thereto.

(Estimation by Estimator 34 and Storage Unit 35)

When the first linear motor 11 is located in the magnetic pole section 210, the estimator 34 previously measures a phase difference F−M between a first phase angle F detected by the first magnetic pole sensor 21 and a second phase angle M detected by the second magnetic pole sensor 22. The measured phase difference F−M is previously stored into the storage unit 35 as a reference phase difference.

Further, when the first linear motor 11 is located in the magnetic pole missing section 220 having a predetermined distance (e.g., one-quarter pitch), the estimator 34 previously measures a phase difference between a first phase angle detected by the first magnetic pole sensor 21 and a second phase angle detected by the second magnetic pole sensor 22, and calculates an amount of deviation of the measured phase difference from the reference phase difference. The obtained amount of deviation is previously stored into the storage unit 35 as a threshold.

The estimator 34 then compares, with the reference phase difference F–M, a phase difference F'–M' between a first phase angle F' detected by the first magnetic pole sensor 21 and a second phase angle M' detected by the second magnetic pole sensor 22 at the present positions, to estimate whether or not the first linear motor 11 is located in the magnetic pole missing section 220. When the phase difference F'–M' between the first phase angle F' and the second phase angle M' at the present positions is deviated from the reference phase difference F–M, the estimator 34 estimates that the first linear motor 11 is located in the magnetic pole missing section 220.

Further, for example, the estimator 34 compares, with the above threshold, an amount of deviation (an absolute value) |(F'–M')–(F–M)| of the phase difference F'–M' between the first phase angle F' and the second phase angle M' at the present positions from the reference phase difference F–M, to estimate whether or not the distance of the magnetic pole missing section 220 is one-quarter pitch. When the distance of the magnetic pole missing section 220 is one-quarter pitch or larger, the estimator 34 supplies the controller 40 with a signal (magnet-less status) indicating a magnet missing state where the first linear motor 11 is located in the magnetic pole missing section 220 and reverse thrust is generated.

Similarly, when the second linear motor 12 is located in the magnetic pole section 210, the estimator 34 previously measures a phase difference F–M between a first phase angle F detected by the third magnetic pole sensor 23 and a second phase angle M detected by the second magnetic pole sensor 22. The measured phase difference F–M is previously stored into the storage unit 35 as a reference phase difference.

Further, when the second linear motor 12 is located in the magnetic pole missing section 220 having a predetermined distance (e.g., one-quarter pitch), the estimator 34 previously measures a phase difference between a first phase angle detected by the third magnetic pole sensor 23 and a second phase angle detected by the second magnetic pole sensor 22, and calculates an amount of deviation of the measured phase difference from the reference phase difference. The obtained amount of deviation is previously stored into the storage unit 35 as a threshold.

The estimator 34 then compares, with the reference phase difference F–M, a phase difference F'–M' between a first phase angle F' detected by the third magnetic pole sensor 23 and a second phase angle M' detected by the second magnetic pole sensor 22 at the present positions, to estimate whether or not the second linear motor 12 is located in the magnetic pole missing section 220. When the phase difference F'–M' between the first phase angle F' and the second phase angle M' at the present positions is deviated from the reference phase difference F–M, the estimator 34 estimates that the second linear motor 12 is located in the magnetic pole missing section 220.

Further, for example, the estimator 34 compares, with the above threshold, an amount of deviation (an absolute value) |(F'–M–)–(F–M)| of the phase difference F'–M' between the first phase angle F' and the second phase angle M' at the present positions from the reference phase difference F–M, to estimate whether or not the distance of the magnetic pole missing section 220 is one-quarter pitch. When the distance of the magnetic pole missing section 220 is one-quarter pitch or larger, the estimator 34 supplies the controller 40 with a signal (magnet-less status) indicating a magnet missing state where the second linear motor 12 is located in the magnetic pole missing section 220 and reverse thrust is generated.

The estimator 34 performs the above estimation at the start of the mobile body 100, for example, when a vehicle controller (receptor) 41 in the controller 40 described later accepts a start signal from a host controller (not illustrated) and the mobile body 100 is started. Note that the estimator 34 may perform the above estimation in the stopped state where the mobile body 100 is stopped after being started.

(Determination by Determination Unit 45, Monitor 58, Drive Information Acquiring Unit, and Drive Command Unit)

The drive information acquiring unit acquires, in real time, drive information (an actual velocity, position information, or an actual current) of the first linear motor 11 being driven toward a target position. In the present embodiment, the drive information acquiring unit (the position converter 32 and the differentiator 55) acquires the actual velocity of the first linear motor 11 in real time. Note that the drive information acquiring unit (the position converter 32) may acquire the position information of the first linear motor 11 in real time, or the drive information acquiring unit (the current sensor 57) may acquire the actual current of the first linear motor 11 in real time.

The drive command unit repeatedly provides, to the first linear motor 11 side, command information (a command velocity or a command current) for moving the mobile body toward the target position based on the drive information (the actual velocity, the position information, or the actual current) acquired each time by the drive information acquiring unit. In the present embodiment, the drive command unit (the velocity controller 52) repeatedly provides a command current for moving the mobile body toward the target position based on the actual velocity from the drive information acquiring unit. Note that the drive command unit (the position controller 51) may repeatedly provide the command velocity for moving the mobile body toward the target position based on the position information from the drive information acquiring unit.

The monitor 58 monitors the command information (the command velocity or the command current) or the drive information (the actual velocity or the actual current). In the present embodiment, the monitor 58 monitors the command current, but it may also monitor the actual current, the command velocity, or the actual velocity and the command velocity.

The determination unit 45 determines whether or not the first linear motor 11 is located in the magnetic pole missing section 220 based on the command information or the drive information (the command current, the actual current, the command velocity, or a difference between the command velocity and the actual velocity) monitored by the monitor 58. In the present embodiment, it is determined whether or not the first linear motor 11 is located in the magnetic pole missing section 220 based on the command current monitored by the monitor 58, but the determination may be performed based on the actual current, the command velocity, or a difference between the command velocity and the actual velocity.

When the linear motor is located in the magnetic pole missing section, the thrust decreases or the reverse thrust is generated. Thereby, the actual velocity of the mobile body becomes lower than the command velocity or becomes a negative velocity, resulting in that the command velocity is controlled to become higher, leading to an increase in difference between the command velocity and the actual velocity. As a result, control to increase the command current and increase the actual current is performed. Hence, for example, when the command current monitored by the monitor 58 exceeds a predetermined threshold, the determination unit 45 determines that the first linear motor 11 is located in the magnetic pole missing section 220.

Although this determination is performed while the first linear motor 11 is actually driven, the determination is repeatedly performed while the first linear motor 11 is driven in a low velocity mode having a velocity lower than a velocity at the time of normal movement, until the mobile body 100 travels a distance corresponding to a predetermined search distance.

Similarly, the drive information acquiring unit acquires, in real time, drive information (an actual velocity, position information, or an actual current) of the second linear motor 12 being driven toward a target position. In the present embodiment, the drive information acquiring unit (the position converter 32 and the differentiator 65) acquires the actual velocity of the second linear motor 12 in real time. Note that the drive information acquiring unit (the position converter 32) may acquire the position information of the second linear motor 12 in real time, or the drive information acquiring unit (the current sensor 67) may acquire the actual current of the second linear motor 12 in real time.

The drive command unit repeatedly provides, to the second linear motor 12 side, command information (a command velocity or a command current) for moving the mobile body toward the target position based on the drive information (the actual velocity, the position information, or the actual current) acquired each time by the drive information acquiring unit. In the present embodiment, the drive command unit (the velocity controller 62) repeatedly provides a command current for moving the mobile body toward the target position based on the actual velocity from the drive information acquiring unit. Note that the drive command unit (the position controller 61) may repeatedly provide the command velocity for moving the mobile body toward the target position based on the position information from the drive information acquiring unit.

The monitor 68 monitors the command information (the command velocity or the command current) or the drive information (the actual velocity or the actual current). In the present embodiment, the monitor 68 monitors the command current, but it may also monitor the actual current, the command velocity, or the actual velocity and the command velocity.

The determination unit 45 determines whether or not the second linear motor 12 is located in the magnetic pole missing section 220 based on the command information or the drive information (the command current, the actual current, the command velocity, or a difference between the command velocity and the actual velocity) monitored by the monitor 68. In the present embodiment, it is determined whether or not the second linear motor 12 is located in the magnetic pole missing section 220 based on the command current monitored by the monitor 68, but the determination may be performed based on the actual current, the command velocity, or a difference between the command velocity and the actual velocity.

For example, when the command current monitored by the monitor 58 exceeds the predetermined threshold, the determination unit 45 determines that the second linear motor 12 is located in the magnetic pole missing section 220.

Although this determination is also performed while the second linear motor 12 is actually driven, the determination is repeatedly performed while the second linear motor 12 is driven in a low velocity mode having a velocity lower than a velocity at the time of normal movement, until the mobile body 100 travels a distance corresponding to a predetermined search distance.

The determination unit 45 performs the above determination at the start of the mobile body 100, for example, when the vehicle controller (receptor) 41 in the controller 40 accepts a start signal from the host controller (not illustrated) and the mobile body 100 is started. Note that the determination unit 45 may perform the above determination in the stopped state where the mobile body 100 is stopped after being started.

Figure 4A:
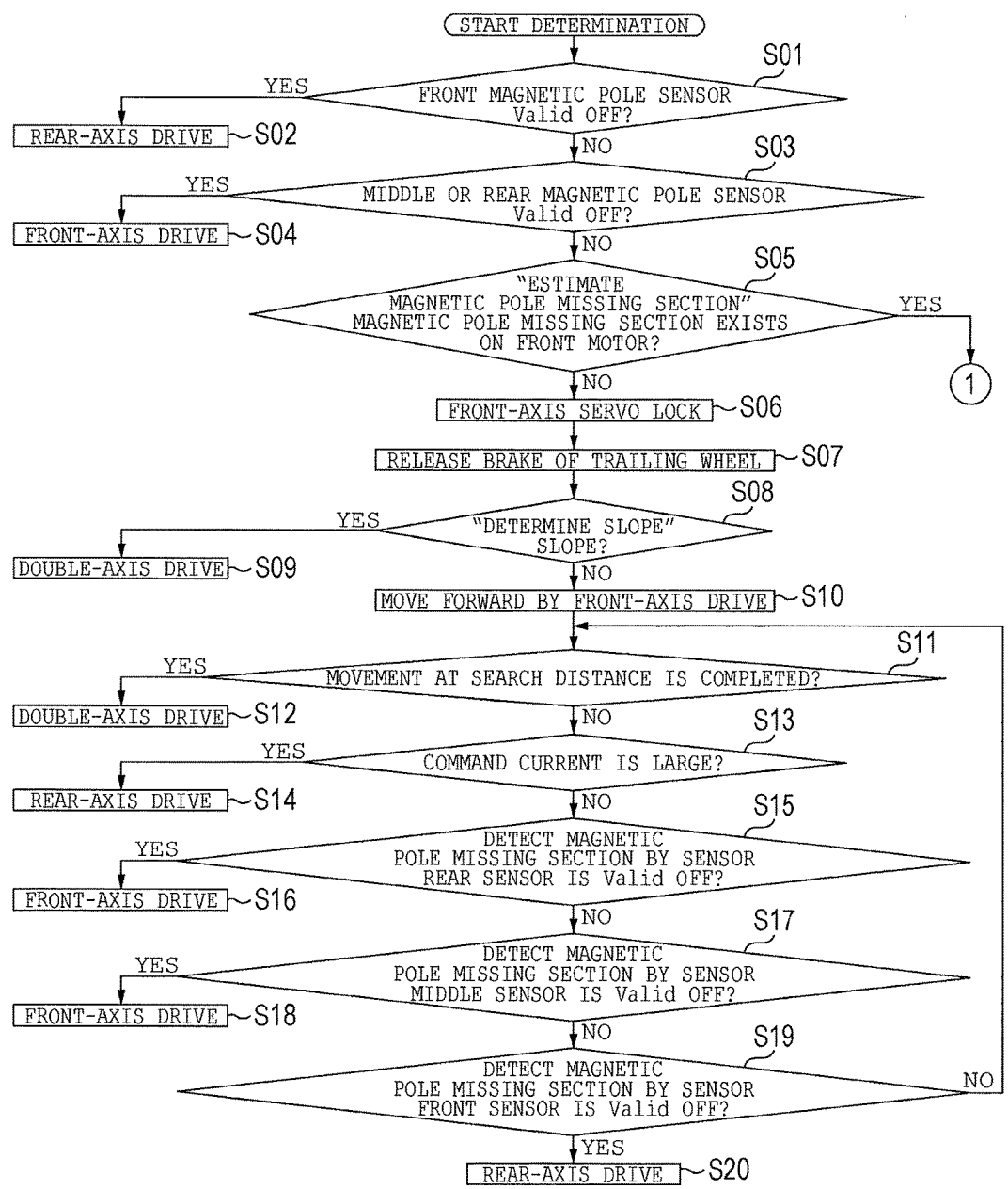
FIG. 4A and FIG. 4B are flowcharts illustrating an operation of the mobile body of the present embodiment.
Figure 4B:
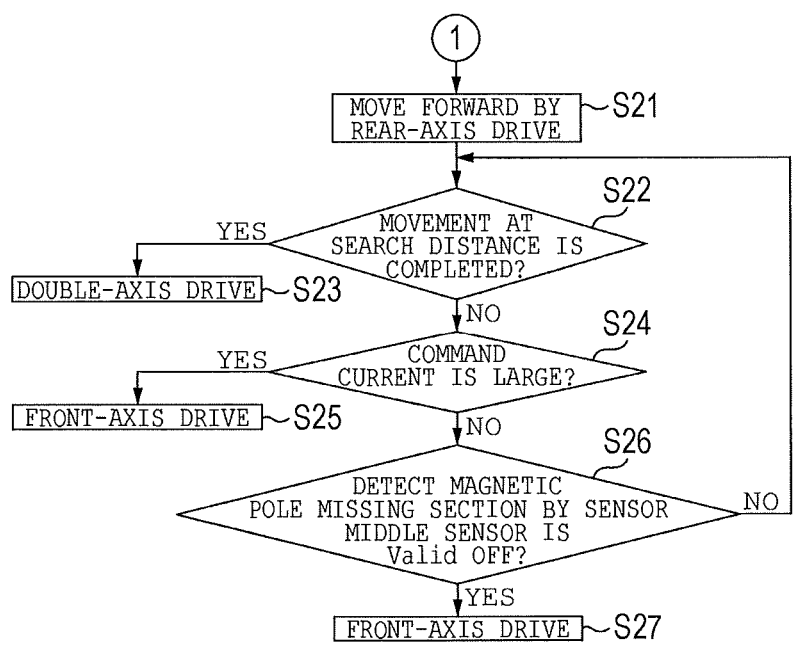

Next, the operation of the mobile body 100 of the present embodiment will be described. FIG. 4A and FIG. 4B are flowcharts illustrating the operation of the mobile body of the present embodiment.

First, based on signals (validations) received from the first, second, and third magnetic pole sensors 21, 22, 23 and indicating the valid/invalid state, it is determined whether each of the first magnetic pole sensor (front magnetic pole sensor) 21, the second magnetic pole sensor (middle magnetic pole sensor) 22, and the third magnetic pole sensor (rear magnetic pole sensor) 23 is located in the magnetic pole missing section 220 or not (valid OFF or not) (Steps S01, S03). When the invalid state signal (validation) is received from the first magnetic pole sensor (front magnetic pole sensor) 21, namely, when the first magnetic pole sensor (front magnetic pole sensor) 21 is located in the magnetic pole missing section 220 (Valid OFF), the drive is performed by the second linear motor 12 by the controller 40 and the second servo amplifier 60 (rear-axis drive) (Step S02). On the other hand, when the invalid state signal (validation) is received from the second magnetic pole sensor (middle magnetic pole sensor) 22 or the third magnetic pole sensor (rear magnetic pole sensor) 23, namely, when the second magnetic pole sensor (middle magnetic pole sensor) 22 or the third magnetic pole sensor (rear magnetic pole sensor) 23 is located in the magnetic pole missing section 220 (Valid OFF), the drive is performed by the first linear motor 11 by the controller 40 and the first servo amplifier 50 (front-axis drive) (Step S04). In this manner, when any of the magnetic pole sensors is already located in the magnetic pole missing section 220 and is in the invalid state (Valid OFF), the drive axis is selected in accordance with the state, and the determination is completed.

On the other hand, when the first magnetic pole sensor 21, the second magnetic pole sensor 22, and the third magnetic pole sensor 23 are not located in the magnetic pole missing section 220, and the sensors are in the valid state (when not Valid OFF), the estimator 34 and the storage unit 35 described above estimate whether or not the first linear motor (front motor) 11 is located in the magnetic pole missing section 220 (Step S05).

When the first linear motor 11 is not located in the magnetic pole missing section 220, front-axis servo lock which stops the mobile body by providing a drive current to the first linear motor 11 is performed (Step S06), to release a brake of a trailing wheel (Step S07). Then, based on the drive current for the front-axis servo lock, it is determined whether or not the mobile body is located on a slope (Step S08).

In the present embodiment, for preventing thrust shortage from occurring when single-axis drive is performed on the slope, or for preventing the drive current from increasing to cause a linear motor thermal design to get out of specification, the magnetic pole missing section is not arranged in the slope section. Accordingly, when the mobile body is located on the slope and the drive current for the front-axis servo lock exceeds a predetermined threshold, the first linear motor 11 is not located in the magnetic pole missing section 220, and hence double-axis drive is performed (Step S09).

On the other hand, when the mobile body is not located on the slope, the drive is performed by the first linear motor 11 in the low velocity mode (front-axis drive) (Step S10), and the determination unit 45, the monitor 58, the drive information acquiring unit, and the drive command unit described above start the determination as to whether or not the first linear motor (front motor) 11 is located in the magnetic pole missing section 220. When the mobile body is moving within a predetermined search distance (Step S11), it is determined whether or not the command current has exceeded the predetermined threshold (Step S13). When the command current increases beyond the predetermined threshold, it is determined that the first linear motor 11 is located in the magnetic pole missing section 220, and switching is made to the drive by the second linear motor 12 (rear-axis drive) (Step S14).

On the other hand, when the command current does not increase beyond the predetermined threshold, similarly to Steps S01 and S02, based on signals (validations) received from the first, second, and third magnetic pole sensors 21, 22, 23 and indicating the valid/invalid state, it is again determined whether each of the first magnetic pole sensor (front magnetic pole sensor) 21, the second magnetic pole sensor (middle magnetic pole sensor) 22, and the third magnetic pole sensor (rear magnetic pole sensor) 23 is located in the magnetic pole missing section 220 or not (valid OFF or not) (Steps S15, S17, S19). When the invalid state signal (validation) is received from the third magnetic pole sensor (rear magnetic pole sensor) 23, namely, when the third magnetic pole sensor (rear magnetic pole sensor) 23 is located in the magnetic pole missing section 220 (Valid OFF), the drive is performed by the first linear motor 11 by the controller 40 and the first servo amplifier 50 (front-axis drive) (Step S16). When the invalid state signal (validation) is received from the second magnetic pole sensor (middle magnetic pole sensor) 22, namely, when the second magnetic pole sensor (middle magnetic pole sensor) 22 is located in the magnetic pole missing section 220 (Valid OFF), the drive is performed by the first linear motor 11 by the controller 40 and the first servo amplifier 50 (front-axis drive) (Step S18). When the invalid state signal (validation) is received from the first magnetic pole sensor (front magnetic pole sensor) 21, namely, when the first magnetic pole sensor (front magnetic pole sensor) 21 is located in the magnetic pole missing section 220 (Valid OFF), the drive is performed by the second linear motor 12 by the controller 40 and the second servo amplifier 60 (rear-axis drive) (Step S20). In this manner, when any of the magnetic pole sensors is located in the magnetic pole missing section 220 and is in the invalid state (Valid OFF) during search traveling, the drive axis is selected in accordance with the state, and the determination is completed.

On the other hand, when the first magnetic pole sensor 21, the second magnetic pole sensor 22, and the third magnetic pole sensor 23 are not located in the magnetic pole missing section 220, and the sensors are in the valid state (when not Valid OFF), the process returns to Step S11, and the processes of Steps S11, S13, S15, S17, and S19 are repeated until the movement of the mobile body by a predetermined search distance is completed. When the command current does not increase beyond the predetermined threshold and the movement of the mobile body by the predetermined search distance is completed (Step S11), it is determined that the first linear motor 11 is not located in the magnetic pole missing section 220, and the drive is performed by the first and second linear motors by the controller 40 and the first and second servo amplifiers 50, 60 (double-axis drive). In this manner, when the command current does not increase during the search traveling and none of the magnetic pole sensors is located in the magnetic pole missing section 220 is in the invalid state (Valid OFF), and the mobile body moves a sufficient movement distance, it is determined that the magnetic pole missing section 220 does not exist on the mobile body, and the process is completed.

On the other hand, when the first linear motor 11 is located in the magnetic pole missing section 220 in Step S05, the drive is performed by the second linear motor 12 in the low velocity mode (rear-axis drive) (Step S21), and the determination unit 45, the monitor 68, the drive information acquiring unit, and the drive command unit described above start the determination as to whether or not the second linear motor (rear motor) 12 is located in the magnetic pole missing section 220. When the mobile body is moving within a predetermined search distance (Step S22), it is determined whether or not the command current has exceeded the predetermined threshold (Step S24). When the command current increases beyond the predetermined threshold, it is determined that the second linear motor 12 is located in the magnetic pole missing section 220, and switching is made to the drive by the first linear motor 11 (front-axis drive) (Step S25).

On the other hand, when the command current does not increase beyond the predetermined threshold, similarly to Steps S01 and S02, based on a signal (validation) received from the second magnetic pole sensor 22 and indicating the valid/invalid state, it is again determined whether the second magnetic pole sensor (middle magnetic pole sensor) 22 is located in the magnetic pole missing section 220 or not (valid OFF or not) (Step S26). When the invalid state signal (validation) is received from the second magnetic pole sensor (middle magnetic pole sensor) 22, namely, when the second magnetic pole sensor (middle magnetic pole sensor) 22 is located in the magnetic pole missing section 220 (Valid OFF), the drive is performed by the first linear motor 11 by the controller 40 and the first servo amplifier 50 (front-axis drive) (Step S27).

On the other hand, when the second magnetic pole sensor 22 is not located in the magnetic pole missing section 220 and is in the valid state (when not Valid OFF), the process returns to Step S22, and the processes of Steps S22, S24, S25, and S26 are repeated until the movement of the mobile body by a predetermined search distance is completed. When the command current does not increase beyond the predetermined threshold and the movement of the mobile body by the predetermined search distance is completed (Step S22), it is determined that the second linear motor 12 is not located in the magnetic pole missing section 220, and the drive is performed by the first and second linear motors by the controller 40 and the first and second servo amplifiers 50, 60 (double-axis drive).

As described above, according to the mobile body 100 of the present embodiment, the estimator 34 can estimate whether or not the linear motor is located in the magnetic pole missing section. Further, the determination unit 45 can determine whether or not the linear motor is located in the magnetic pole missing section. Moreover, the magnetic pole sensor can recognize the existence of the magnetic pole missing section. As thus described, by having the plurality of kinds of detection functions, it is possible to accurately detect that the linear motor is located in the magnetic pole missing section on the magnetic pole path.

Note that the present invention is not limited to the present embodiment described above, and a variety of modifications are possible. For example, in the present embodiment, the estimator 34 and the storage unit 35 have estimated whether or not the linear motor is located in the magnetic pole missing section 220 having a distance longer than one-quarter pitch, namely, the magnetic pole missing section where the reverse thrust is generated. However, in a system where the drive can be stopped due to reversal travel abnormality, this estimation may not be performed.

Further, in the present embodiment, it has been determined whether or not the mobile body is located on the slope based on the drive current for the servo lock. However, in a system in which the magnetic pole missing section is arranged on the slope, this determination may not be performed.

Moreover, although the mobile body having two linear motors has been illustrated in the present embodiment, the mobile body may have three or more linear motors.

Furthermore, although the mobile body 100 (the controller 40) including the determination unit 45 has been illustrated in the present embodiment, an external controller communicably connected with the controller 40 of the mobile body 100 may have the function of the determination unit 45. In this case, the determination may be performed based on information received from the mobile body 100 (the controller 40), to control the mobile body 100 based on the determination result.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A mobile body that moves along a magnetic pole path having a magnetic pole section in which a plurality of pairs of magnetic poles, each including a north pole and a south pole, are arranged, and a magnetic pole missing section in which the magnetic pole is missing, the mobile body comprising:
   a plurality of linear motors including a first linear motor that is driven by magnetic interaction with a magnetic flux of the magnetic pole path;
   a drive information acquiring unit that acquires, in real time, drive information of the first linear motor being driven toward a target position;
   a drive command unit that repeatedly provides, to the first linear motor side, command information for moving the mobile body toward the target position based on the drive information acquired each time by the drive information acquiring unit;
   a monitor that monitors the command information or the drive information; and
   a determination unit that determines whether or not the first linear motor is located in the magnetic pole missing section based on the command information or the drive information monitored by the monitor.

2. The mobile body according to claim 1, wherein
   the drive information acquiring unit acquires an actual velocity of the first linear motor in real time,
   the drive command unit repeatedly provides, to the first linear motor side, a command current for moving the mobile body toward the target position based on the actual velocity acquired by the drive information acquiring unit, and
   the monitor monitors the command current.

3. The mobile body according to claim 2, wherein
   when the command current monitored by the monitor exceeds a first threshold, the determination unit determines that the first linear motor is located in the magnetic pole missing section.

4. The mobile body according to claim 2, wherein
   the magnetic pole path includes a tilt path with a height difference in a vertical direction,
   the magnetic pole missing section is provided on a path other than the tilt path in the magnetic pole path,
   the drive command unit provides, to the first linear motor side, the command information such that the first linear motor holds its own position by feedback of an actual current value acquired by the drive information acquiring unit when the mobile body is in a stopped state, and
   the determination unit determines that the first linear motor is not located in the magnetic pole missing section based on the command current value monitored by the monitor.

5. The mobile body according to claim 1, further comprising
   a receptor that accepts a start signal for instructing to shift from a stopped state where the mobile body is stopped to a started state,
   wherein, when the receptor accepts the start signal, the determination unit determines whether or not the first linear motor is located in the magnetic pole missing section.

6. The mobile body according to claim 1, wherein
   the mobile body is movable in a low velocity mode having a velocity lower than a velocity at the time of normal movement, and
   while the mobile body moves a certain distance in the low velocity mode, the determination unit determines whether or not the first linear motor is located in the magnetic pole missing section.

7. The mobile body according to claim 6, further comprising
   a magnetic pole-less detecting sensor for detecting the magnetic pole missing section.

8. The mobile body according to claim 7, wherein
   when the magnetic pole-less detecting sensor does not detect the magnetic pole missing section, the determination unit starts determination of whether or not the first linear motor is located in the magnetic pole missing section.

9. The mobile body according to claim 1, further comprising:
   a first detector that is disposed on one side with respect to the first linear motor in a path direction of the magnetic pole path, and detects a first phase angle in accordance with the magnetic flux of the magnetic pole path;
   a second detector that is disposed on the other side with respect to the first linear motor in the path direction of the magnetic pole path, and detects a second phase angle in accordance with the magnetic flux of the magnetic pole path;
   a storage unit that previously stores, as a reference phase difference, a phase difference between the first phase angle detected by the first detector and the second phase angle detected by the second detector, the phase difference at the time when the first linear motor is located in the magnetic pole section; and
   an estimator that estimates whether or not the first linear motor is located in the magnetic pole missing section based on an amount of deviation of the phase difference from the reference phase difference, the phase difference between the first phase angle detected by the first detector and the second phase angle detected by the second detector.

10. A mobile body system comprising:
a magnetic pole path having a magnetic pole section in which a plurality of pairs of magnetic poles, each including a north pole and a south pole, are arranged, and a magnetic pole missing section in which the magnetic pole is missing;
a mobile body that moves along the magnetic pole path, the mobile body including
a plurality of linear motors disposed in the mobile body, the plurality of linear motors including a first linear motor that is driven by magnetic interaction with a magnetic flux of the magnetic pole path,
a drive information acquiring unit that acquires, in real time, drive information of the first linear motor being driven toward a target position,
a drive command unit that repeatedly provides, to the first linear motor side, command information for moving the mobile body toward the target position based on the drive information acquired each time by the drive information acquiring unit, and
a monitor that monitors the command information or the drive information; and
a determination unit that determines whether or not the first linear motor is located in the magnetic pole missing section based on the command information or the drive information monitored by the monitor.

11. The mobile body system according to claim 10, wherein
the drive information acquiring unit acquires an actual velocity of the first linear motor in real time,
the drive command unit repeatedly provides, to the first linear motor side, a command current for moving the mobile body toward the target position based on the actual velocity acquired by the drive information acquiring unit, and
the monitor monitors the command current.

12. The mobile body system according to claim 11, wherein
when the command current monitored by the monitor exceeds a first threshold, the determination unit determines that the first linear motor is located in the magnetic pole missing section.

13. The mobile body system according to claim 11, wherein
the magnetic pole path includes a tilt path with a height difference in a vertical direction,
the magnetic pole missing section is provided on a path other than the tilt path in the magnetic pole path,
the drive command unit provides, to the first linear motor side, the command information such that the first linear motor holds its own position by feedback of an actual current value acquired by the drive information acquiring unit when the mobile body is in a stopped state, and the determination unit determines that the first linear motor is not located in the magnetic pole missing section based on the command current value monitored by the monitor.

14. The mobile body system according to claim 10, further comprising
a receptor that accepts a start signal for instructing to shift from a stopped state where the mobile body is stopped to a started state,
wherein, when the receptor accepts the start signal, the determination unit determines whether or not the first linear motor is located in the magnetic pole missing section.

15. The mobile body system according to claim 10, wherein
the mobile body is movable in a low velocity mode having a velocity lower than a velocity at the time of normal movement, and
while the mobile body moves a certain distance in the low velocity mode, the determination unit determines whether or not the first linear motor is located in the magnetic pole missing section.

16. The mobile body system according to claim 15, further comprising
a magnetic pole-less detecting sensor for detecting the magnetic pole missing section.

17. The mobile body system according to claim 16, wherein
when the magnetic pole-less detecting sensor does not detect the magnetic pole missing section, the determination unit determines whether or not the first linear motor is located in the magnetic pole missing section.

18. The mobile body system according to claim 10, further comprising:
a first detector that is disposed on one side with respect to the first linear motor in a path direction of the magnetic pole path, and detects a first phase angle in accordance with the magnetic flux of the magnetic pole path;
a second detector that is disposed on the other side with respect to the first linear motor in the path direction of the magnetic pole path, and detects a second phase angle in accordance with the magnetic flux of the magnetic pole path;
a storage unit that previously stores, as a reference phase difference, a phase difference between the first phase angle detected by the first detector and the second phase angle detected by the second detector, the phase difference at the time when the first linear motor is located in the magnetic pole section; and
an estimator that estimates whether or not the first linear motor is located in the magnetic pole missing section based on an amount of deviation of the phase difference from the reference phase difference, the phase difference between the first phase angle detected by the first detector and the second phase angle detected by the second detector.

* * * * *